Figure 1:
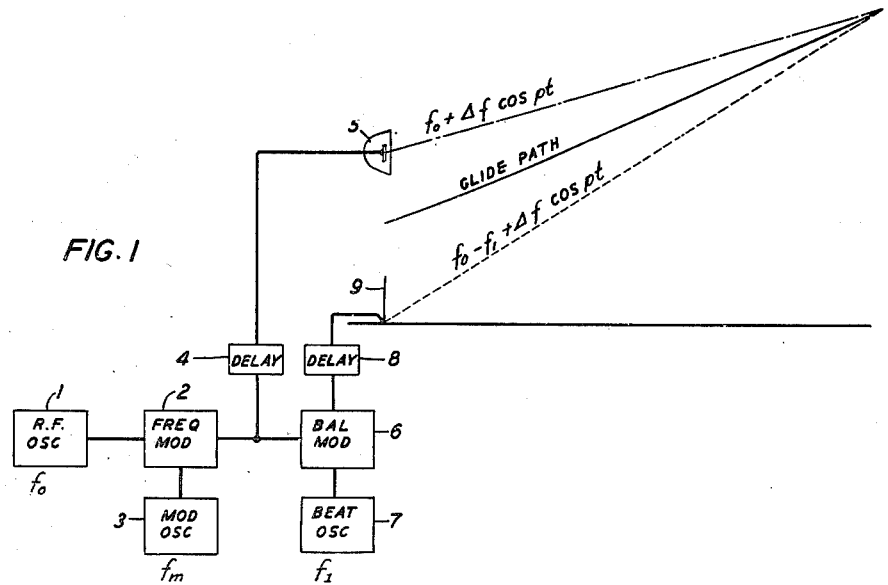

Feb. 25, 1947.                R. C. NEWHOUSE                2,416,342
                     ALTITUDE GUIDING SYSTEM FOR AIRCRAFT
                            Filed Dec. 3, 1941

INVENTOR
R.C. NEWHOUSE
BY
E. V. Griggs
ATTORNEY

Patented Feb. 25, 1947

2,416,342

UNITED STATES PATENT OFFICE 2,416,342

ALTITUDE GUIDING SYSTEM FOR AIRCRAFT

Russell C. Newhouse, Millburn, N. J., assignor to Bell Telephone Laboratories, Incorporated, New York, N. Y., a corporation of New York Application December 3, 1941, Serial No. 421,439

11 Claims. (Cl. 250—11)

This invention relates to systems for guiding an airplane during its descent to an airport, and particularly, to systems using radio waves of continually varying frequency.

The object of the invention is a radio glide path which is unaffected by variations in the reflecting properties of the surface of the airport.

A feature of the invention is a dual antenna system which forms a pattern of radio waves in space substantially independently of the reflection of the earth.

Another feature of the invention is a radio glide path formed by the interaction of two sets of radio waves which, at all times, differ in frequency by the same amount.

Another feature of the invention is an antenna system which forms a radio glide path located to one side of the antenna system.

Another feature of the invention is a radio glide path system in which the received indications are proportional to a function of the glide angle, and, in which the meter calibration or sensitivity may be changed to indicate a different glide angle.

In previous systems using radio waves to guide an airplane to a landing field, the pattern of the radio waves in space depended upon the reflection of radio waves by the surface of the airport, or the earth, in the vicinity of the transmitting antenna. The pattern was formed by the interaction of the directly transmitted waves and the reflected waves. Thus, any change in the reflecting properties of the surface changed the relative magnitude in space of the direct and reflected waves and the pattern formed thereby. The location of the airplane in space was determined by a measurement of the absolute magnitude of the intensity of the radio waves forming the pattern, or the relative magnitudes of the direct and reflected waves. A change in the magnitude of the direct or the reflected wave might produce an erroneous determination.

In the present system, the pattern of radio waves in space is formed substantially independently of the reflecting properties of the surface, and the determination of the position of the airplane is substantially unaffected by a change in the reflecting properties of the surface. The position of the airplane is determined by the difference in frequency between two directly transmitted radio waves and is substantially unaffected by the absolute magnitude of the intensity of the waves, or the relative magnitudes of the two waves.

Figure 2:
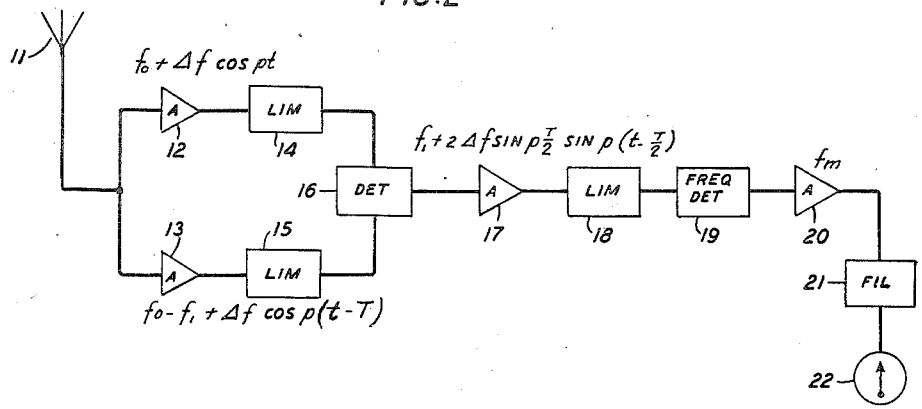

In the drawings:

Fig. 1 diagrammatically shows a transmitting station embodying the invention; and Fig. 2 diagrammatically shows the receiving equipment on the airplane cooperating with the station shown in Fig. 1.

An oscillator 1 produces a carrier current of frequency $f_0$, which is supplied to a frequency modulator 2. A modulating oscillator 3 sweeps the frequency of the carrier current through a band of width $2\Delta f$, at a rate $f_m$. For the purposes of discussion, the variation of the frequency of the carrier current may be cosinusoidal, though this choice is not to be considered as a limitation upon the invention, as other modes of variation, such as a linear variation may be used if desired. The output of the frequency modulator will be a current having a frequency $f_0 + \Delta f \cos pt$, where $p = 2\pi f_m$, and this current is supplied through a delay network 4 to a highly directive antenna 5.

A portion of the output of the frequency modulator 2 is supplied to a balanced modulator 6, where it is combined with the output of a beating oscillator 7 producing a current of frequency $f_1$. The modulator 6 is balanced to transmit only one side-band of the products of the combination. Either side-band may be used, but, as the current of frequency $f_0$ is preferably of very high frequency, the lower side-band is usually preferable. Thus, currents having a frequency $f_0 - f_1 + \Delta f \cos pt$ are supplied through the delay network 8 to the antenna 9.

The antenna 9 may be a simple vertical quarter wave grounded radiator. In theoretical considerations of such a radiator, it is sometimes assumed that the wave is radiated by the actual antenna above the ground, and its image below the ground. However, with the high frequencies used in measurements of the present type, the antenna 9 is of small physical dimensions, and may be considered as virtually a point source, thus the radiation from this antenna is not substantially affected by variations in the reflecting properties of the earth. The antenna 5 may be combined with a reflector or resonator to radiate a highly directive beam having a pattern such that the waves reflected from the surface are not more than say 10 per cent of the total radiation.

The glide path is formed substantially midway between the antennas 5 and 9, and should not be more than the height of the airplane receiving antenna above ground. For the larger transport planes, the glide path may be a distance $a$ of the order of 10 feet, above the surface, thus, for these large airplanes, the antenna 5 may be as much as 20 feet above the surface of the airport.

On the airplane, the radio waves are received on the antenna 11, and supplied to two radio receivers 12, 13. The radio receivers 12, 13, may be of any suitable type, such as a tuned radio receiver, having sufficient sensitivity, and selective enough to distinguish between the waves from the antennas 5 and 9, but having a reception band broad enough to receive the variations in the received waves.

The outputs of the radio receivers 12, 13 are respectively supplied to limiting devices 14, 15, which limit amplitudes of the currents to remove any amplitude variations, due to changes in transmission. The radio receivers 12, 13, may include known types of automatic volume control so as to equalize the outputs of the receivers 12, 13, for varying distances between the airplane and the antennas 5, 9.

The limited outputs from the radio receivers 12, 13 are combined in the detector to produce a current having a frequency $$f_i + 2\Delta f \sin p\frac{T}{2} \sin p\left(t - \frac{T}{2}\right)$$

where T is the difference in time between the transmission from the antenna 9 and the antenna 5.

The intermediate frequency current may be amplified, if desired, in the amplifier 17, and supplied to an amplitude limiter 18. The limiter 18 cooperates with the limiters 14 and 15 to remove any amplitude variations from the received currents. In some cases, if the amplitude variations are small, the limiter 18 may be omitted.

The intermediate frequency current, as limited, is supplied to a frequency detector 19, which may be a slope detector of the type commonly used in frequency modulation radio receivers.

The output of the frequency detector 19 will be a current of frequency $f_m$ and amplitude proportional to $$2\Delta f \sin p\frac{T}{2}$$

or $$2\Delta f \sin 2\pi f_m \frac{a}{c} \sin \theta$$

where $\theta$ is the angle of glide, and C the velocity of propagation of the wave. This current may be amplified, if necessary, in the amplifier 20, filtered to remove undesired frequencies in the filter 21, and supplied to an alternating current meter 22. The meter 22 may be of the known crossed hand type, the horizontal hand being controlled by the filtered current to indicate the position of the airplane above, on, or below the desired course.

The meter current has an amplitude proportional to $$2\Delta f \sin 2\pi f_m \frac{a}{c} \sin \theta$$

thus, the path for any given value of $\theta$ is hyperbolic in shape. The glide paths are actually the tangents to the hyperbolas traced on a vertical plane through the axis of the antenna array by a series of hyperboloids of revolution about the vertical axis of the antenna array. The paths traced by the hyperboloids of revolution on any vertical plane parallel to the axis of the antenna array will also be hyperbolas, but, the apices of these hyperbolas will be slightly higher from the ground than the apex of the hyperbola of the same signal amplitude in the vertical plane through the axis of the antenna array. Thus, the antenna array need not be located on the desired glide path, but may be located to one side, free from any danger of a collision. In such case, the antenna array may be lowered so that the apex of the desired hyperbola is not higher from the ground than the receiving antenna of the plane, and the scale of the meter may be chosen for these conditions.

As the amplitude of the meter current is proportional to the sine of the angle of glide, by changing the sensitivity of the meter or by using different reference points on the meter scale for the on glide path indication, paths may be chosen suitable for airplanes having different normal gliding angles. Also, as the preferred gliding angle of an airplane descending at a given rate depends upon the wind, means may be provided to change the sensitivity of the meter, or the reference point on the meter, to make the indicated glide path correct for the given values of wind, air speed and rate of descent.

As the present system gives only an indication of the vertical location of the airplane with respect to a desired glide path, this system should be used in conjunction with some type of horizontal directional beacon, such as the known A–N type.

In a practical embodiment of the present system, in which the glide path is some 10 feet from the ground, and the angle of glide of the airplane is assumed to be less than 10 degrees, with a meter reading zero at the horizontal $f_0$ may be 4000 megacycles, $\Delta f$ may be 100 megacycles, and $f_m$ may be about 45 kilocycles.

If desired, the delay networks 4, 8 may be adjusted to make the meter reading zero for the vertical direction but in this case only a small part of the meter scale will normally be used in following the glide path.

What is claimed is:

1. A system for establishing in a vertical plane a course for aircraft carrying a receiving antenna, said course being above the surface of the landing field, including two energized antennas, one of said antennas being a vertical antenna positioned at or near the surface of the landing field, and the other antenna being spaced above the surface of the landing field substantially twice the height of the receiving antenna of said aircraft when said aircraft is located on said landing field.

2. A system for establishing in a vertical plane a course for aircraft including an antenna spaced above the earth, an antenna at the surface of the earth, a source of radio frequency waves, means for cyclically varying the frequency of said waves, means for supplying cyclically varied waves from said source to one of said antennas, a source of waves of constant frequency, means for combining constant frequency waves from said source with cyclically varying waves from said first source to produce cyclically varying waves having a constant difference in frequency from the waves from said first source and means for supplying said latter waves to the other of said antennas.

3. A system for establishing in a vertical plane a course for aircraft carrying a receiving antenna, said course being above the surface of the landing field, including two energized antennas, one of said antennas being a vertical antenna positioned at or near the surface of said landing field, the other of said antennas being spaced above the surface of the landing field substantially twice the height of the receiving antenna of said aircraft when said aircraft is located on said landing field, and a reflector associated with said other antenna to direct a large proportion of the radiated energy into space and a negligible proportion to the surface of the landing field.

4. In a system for guiding an aircraft including two antennas at the landing field spaced apart vertically and respectively energized by two sources of radio waves cyclically varying in frequency but having a constant difference in frequency, an antenna on the aircraft for receiving waves from said two antennas, two receiving sets respectively tuned to receive waves from only one of said two antennas, means associated with each of said receiving sets for limiting the amplitudes of the received waves, means for combining the outputs of said receiving sets to produce a combined wave, means for limiting the amplitude of said combined wave, a detector for converting said combined wave into an electric current of constant frequency varying in amplitude in accordance with the difference in the distances to the two antennas and a meter operated by said latter current to indicate the deviation of said aircraft from a desired vertical path.

5. A system for establishing in a vertical plane a hyperbolic radio course for aircraft including two antennas located on one side of said plane, one of said antennas being positioned at the surface of the earth, the other of said antennas being spaced above the earth, a source of radio waves cyclically varying in frequency, means for supplying waves from said source to one of said antennas, and means for supplying waves from said source to the other of said antennas, said latter waves having a constant difference in frequency but the same cyclic variation in frequency as the waves supplied to the first of said antennas.

6. In a system for guiding aircraft including two antennas at the landing field spaced apart vertically and respectively energized by two sources of radio waves cyclically varying in frequency but having a constant difference in frequency, means on said aircraft for independently receiving the waves from said antennas, and means for combining said independently received waves to produce a current varying in amplitude with a function of a desired angle of glide of said plane.

7. In a system for guiding aircraft, two vertically spaced antennas, two sources of radio waves cyclically varying in frequency but having a constant difference in frequency respectively energizing said antennas to produce in a vertical plane in space a field of force having maxima forming a hyperbolic pattern, an antenna on said aircraft, means for detecting the energy extracted by said latter antenna from said field, means for converting the output of said detector into a current proportional in amplitude to the sine of the angle of inclination of the tangent to one of said maxima, and a meter for indicating the amplitude of said current.

8. In a system for guiding aircraft, two vertically spaced antennas, two sources of radio waves cyclically varying in frequency but having a constant difference in frequency respectively energizing said antennas to produce in a vertical plane in space a field of force forming a hyperbolic pattern, an antenna on said aircraft, means for detecting the energy extracted by said latter antenna from said field, means for converting the output of said detector into a current proportional in amplitude to the sine of the angle of inclination of the tangent to one of said hyperbolas, and a meter actuated by said current and calibrated to indicate said one hyperbola.

9. The method of guiding a mobile body in space to a landing area which comprises creating in space a field of force having maxima forming a family of hyperboloids about a vertical axis, receiving energy from said field on said body, converting said received energy into a current proportional in amplitude to the sine of the angle of inclination of the tangent to one of the hyperbolas formed by said field on a plane parallel to but not including said vertical axis, navigating said body in space to select by the indications of said current a hyperbola having a vertex not higher from the landing area than the point of reception on said body after landing and guiding said body down said hyperbola to said landing area by keeping said current constant.

10. A system for establishing in a vertical plane at least one course for guiding a mobile body to a surface which includes a first antenna positioned at or adjacent to said surface and arranged to radiate vertically polarized waves, a second antenna spaced above said first antenna, a reflector associated with said second antenna to direct a large proportion of the radiated waves into space and a negligible proportion to said surface, and means for energizing both said antennas with radio energy having the same variation in frequency but a constant difference in frequency between the energy supplied to said first antenna and the energy supplied to said second antenna.

11. A system for establishing in a vertical plane a course for guiding a mobile body to a surface which includes a vertical antenna positioned at or adjacent to said surface, a second antenna spaced above said vertical antenna, a reflector associated with said second antenna to direct a large proportion of the radiated waves into space and a negligible proportion to said surface, and means for energizing both said antennas with radio energy having the same variation in frequency but a constant difference in frequency between the energy supplied to said vertical antenna and the energy supplied to said second antenna.

RUSSELL C. NEWHOUSE.

REFERENCES CITED

The following references are of record in the file of this patent:

UNITED STATES PATENTS

| Number | Name | Date |
|---|---|---|
| 2,206,896 | Higgins et al. | July 9, 1940 |
| 2,268,587 | Guanella | Jan. 6, 1942 |
| 2,186,554 | Perroux | Jan. 9, 1940 |
| 2,241,897 | Alford | May 13, 1941 |

FOREIGN PATENTS

| Number | Country | Date |
|---|---|---|
| 811,700 | French | Jan. 23, 1937 |